United States Patent [19]
Weltzien et al.

[11] Patent Number: 4,846,870
[45] Date of Patent: Jul. 11, 1989

[54] FERTILIZER AND/OR SOIL AMENDMENT

[75] Inventors: Robert F. Weltzien; Graeme Berlyn, both of Hamden, Conn.

[73] Assignee: Soilizer Corporation, New Haven, Conn.

[21] Appl. No.: 191,954

[22] Filed: May 9, 1988

[51] Int. Cl.$^4$ ............................................. C05F 11/02
[52] U.S. Cl. ........................................... 71/24; 71/23; 71/11; 71/27
[58] Field of Search ................... 71/1, 11, 2 B, 24, 27

[56] References Cited

U.S. PATENT DOCUMENTS

| 2,570,537 | 10/1951 | Finch | 71/2.5 |
| 3,264,084 | 8/1966 | Karcher | 71/24 |
| 3,940,257 | 2/1976 | Sherwin et al. | 71/23 |
| 4,589,906 | 5/1986 | Brunn et al. | 71/80 |
| 4,787,307 | 11/1988 | Marihart | 71/11 |

FOREIGN PATENT DOCUMENTS

| 750594 | 11/1970 | Belgium | 71/24 |
| 1039077 | 9/1978 | Canada | 71/24 |
| 0695993 | 11/1979 | U.S.S.R. | 71/24 |

Primary Examiner—Ferris H. Lander
Attorney, Agent, or Firm—Bachman & LaPointe

[57] ABSTRACT

The present invention relates to a fertilizer and/or soil amendment containing L ascorbic acid, marine algae, and humic acid. The fertilizer and/or soil amendment may be produced in a solid form or a liquid form. The fertilizer has utility in promoting the growth of grass and plants. A method of preparing the fertilizer and/or soil amendment is also described.

14 Claims, No Drawings

FERTILIZER AND/OR SOIL AMENDMENT

BACKGROUND OF THE INVENTION

The present invention relates to a solution suitable for use as fertilizer for promoting the growth of grass and plants and as a soil amendment and method of preparing the solution. The invention further relates to a solid composition having utility as a fertilizer for grass and plants and as a soil amendment.

Many different types of grass and plant fertilizers and/or soil amendments are used commercially. Some of these fertilizers and/or soil amendments are based on sources of humic acid such as lignite or leonardite ore while others are based on marine algae such as kelp or seaweed. U.S. Pat. No. 2,570,537 to Finch for example illustrates a process for producing colloidal humus for use in horticulture or agriculture to assist the germination of seeds, the rooting and growth of cuttings, and the growth of seedlings and plants and to improve the fertility of the soil. The process consists of passing a composite solution containing a salt of alginic acid, inorganic plant food substances and plant growth hormones through a bed containing peat which has been inocculated with soil bacteria, collecting the fluid drained from the bed, precipitating the fluid in a bath of soluble calcium salt, straining the precipitate, removing residual fluid therefrom and drying the product so obtained. U.S. Pat. No. 3,264,084 to Karcher exemplifies a soil nutrient formed from lignite-leonardite ore. U.S. Pat. No. 3,940,257 to Sherwin et al. illustrates a soil conditioning and fertilizer compound composed of particulate seaweed intimately mixed with particulate tree bark.

Despite the numerous fertilizers and soil amendments commercially available, there is still a demand for improved products capable of serving a variety of needs.

Accordingly, it is an object of the present invention to provide a solution which can be used in both horticulture and agriculture as a fertilizer with grass and plants as well as a soil amendment.

It is a further object of the present invention to provide a relatively simple and inexpensive method for preparing the above solution.

It is yet a further object of the present invention to provide a solid form of the above solution formulation suitable for use as a fertilizer for grass and plants and as a soil amendment.

These and further objects and advantages will become more apparent from the following description.

SUMMARY OF THE INVENTION

In accordance with the present invention, the foregoing objects and advantages are obtained using aqueous solutions consisting essentially of from about 0.05% to about 15% L ascorbic acid, from about 10% to about 50% marine algae and the balance humic acid and water. The humic acid in these solutions is preferably present in an amount from about 30% to about 80% and most preferably in an amount from about 55% to about 65%. As used herein, the percentages are volume percentages unless otherwise specified. As used herein the term solution includes suspensions, emulsions and dispersions. Solutions with the above formulation have been found to have utility both as a fertilizer for promoting the growth of grass and plants and as a soil amendment.

Solutions having a composition or formulation consisting essentially of from about 0.5% to about 2% L ascorbic acid, from about 10% to about 50% marine algae, from about 30% to about 80% humic acid and the balance essentially water have been found to be particularly useful in promoting root growth of grass and plants. Solutions having a composition or formulation consisting essentially of from about 4% to about 6% L ascorbic acid, from about 10% to about 50% marine algae, and from about 30% to about 80% humic acid and the balance essentially water have been found to be particularly useful in promoting overall plant growth.

It is believed that solid compounds having similar formulations provide equally beneficial results. A particularly useful solid composition appears to be one which includes a humus solid such as a salt of humic acid, marine algae and L ascorbic acid added as potassium or sodium ascorbate with the weight ratio of the humic acid salt to the L ascorbic acid being from about 2:1 to about 5:1 and the weight ratio of marine algae to L ascorbic acid being from about 1:1 to about 2:1.

For reasons to be explained in more detail hereinafter, the method of preparing the solutions of the present invention has been found to be quite important. Broadly this method comprises adding L ascorbic acid in a dry state to water to form a solution having a pH in the range of from about 4.0 to about 6.0, preferably from about 5.5 to 6.0, adding marine algae and finally adding humic acid in a water solution. If necessary, a neutralizing agent such as sodium hydroxide or potassium hydroxide may be added to raise the pH to a pH in the range of from about 5.5 to about 7.0.

DETAILED DESCRIPTION

As previously discussed, aqueous solutions and solid compounds in accordance with the present invention may be used as a fertilizer or soil amendment to stimulate the root growth of grass, sod and plants. They may also be used to stimulate overall plant growth and as a soil amendment.

Solutions in accordance with the present invention are aqueous solutions consisting essentially of from about 0.05% to about 15%, preferably from about 1% to about 5%, L ascorbic acid, from about 10% to about 50%, preferably from about 20% to about 35%, marine algae, and the balance humic acid in a water solution. For many applications, humic acid is present in the solution in an amount from about 30% to about 80%, and preferably in a volume from 55% to about 65%. In dilute forms of the solution humic acid may be present in an amount from about 30% to about 40%. In concentrated forms of the solution humic acid may be present in an amount from about 60% to about 70%. Water may be present in a volume up to about 50% of the solution in the dilute solutions and up to about 10% in the concentrated solutions.

The L ascorbic acid is believed to be a significant ingredient in the solutions of the present invention. It is believed that the L ascorbic acid in these solutions detoxifies the possible effects of residual pesticides or herbicides formed from synthetic auxins or other growth regulators in soil. It is also believed that the L ascorbic acid promotes wood formation in plants such as pines and promotes an increased rate of plant biomass production. The implications of this are quite important to food crop agriculture systems as well as to forestry, horticulture, agroforestry and turf grass production.

The humic acids in the solution may comprise acid radicals in Leonardite or Lignite. Alternatively, the humic acids in the solution may be extracted from peat or other organic materials. The humic acid as will be seen hereinafter is present in the solution in the form of humic acid in a water solution. The marine algae in the solution preferably comprises kelp or seaweed.

Particularly useful solution formulations for promoting root growth and overall plant growth have been identified. To promote root growth, an aqueous solution consisting essentially of from about 0.5% to about 2% L ascorbic acid, from about 10% to about 50%, preferably about 20% to about 35%, marine algae, from about 30% to about 80%, preferably from about 55% to about 65%, humic acid and the balance essentially water may be used. To promote overall plant growth, an aqueous solution consisting essentially of from about 4% to about 6% L ascorbic acid, from about 10% to about 50%, preferably from about 20% to about 35%, marine algae, from about 30% to about 80%, preferably from about 55% to about 65%, humic acid and the balance essentially water may be used.

It is believed that a solid form of the humic acid, marine algae, and L ascorbic acid formulations of the present invention may be used with equally beneficial results. A solid compound in accordance with the present invention suitable for use as a fertilizer for grass and plants and as a soil amendment consists essentially of a humus solid such as a salt of humic acid, marine algae and L ascorbic acid in the form of an ascorbate such as potassium or sodium ascorbate with the weight ratio of the humic acid salt to L ascorbic acid being from about 2:1 to about 5:1 and the weight ratio of the marine algae to L ascorbic acid being from about 1:1 to about 2:1.

It has been found that the method of preparing the aqueous solutions of the present invention is most important. L ascorbic acid has a pH of 2 while humic acid and marine algae each have a pH in the range of 9-10. Unless the solution ingredients are mixed in a particular order, a solid crust may be formed at the top of the solution as a result of the extreme pH differences of the ingredients. Therefore, to form the aqueous solutions of the present invention, from about 10 to 25 parts ascorbic acid are added to about 50 parts to about 500 parts water. At this point, from about 5 to about 10 parts of a neutralizing substance such as potassium hydroxide or sodium hydroxide may be added to the mixture so as to form a solution having a pH in the range of from about 5.5 to about 7.0, preferably from about 6.0 to about 6.5. After this, from about 100 parts to about 300 parts marine algae is added. In the final step, from about 300 to about 600 parts humic acid is added to the solution. In the above formula, the ascorbic acid is in powder or granule form; the neutralizer may be in liquid or granule form and the marine algae and humic acid are both solids suspended in water. The solids level may be similar to the solid form of the product described in the next paragraph.

The solid form of the compositions of the present invention may be formed by mixing together potassium or sodium ascorbate, marine algae and a humic acid salt in the aforementioned ratios. For example, a useful composition consists of about 250 grams potassium ascorbate, 250 grams marine algae and 500 grams humic acids.

To demonstrate the utility of the solutions of the present invention, the following example was performed.

EXAMPLE I

A series of experiments was conducted with several hundred seedlings of loblolly pine (Pinus taeda) and Caribbean pine (Pinus caribaea Var. hondurensis). The seedlings were randomly treated with solutions containing 60% humic acid, 30% marine algae, and either 0, 1, 2 or 5% L ascorbic acid, balance water. The solutions were diluted 100:1 with water prior to being applied. In every case, the seedlings treated with a solution containing L ascorbic acid exhibited superior growth as compared to those seedlings receiving solutions without any L ascorbic acid.

In these experiments all plants were grown in close proximity in the same greenhouse under conditions as similar as possible in a greenhouse environment.

The improved growth using the formulations containing L ascorbic acid was apparent within two weeks after treatment. New needle growth of the seedlings was observed to be almost double for seedlings treated with solutions containing L ascorbic acid as compared to seedlings treated with solutions without any L ascorbic acid. The plants treated with the L ascorbic acid formulations also produced more chlorophyll as indicated by their deeper green color.

Based on still other experiments, it is believed that fertilizer solutions in accordance with the present invention may substantially eliminate the toxic effects of a high concentration of auxin (indole acetic acid). Since many herbicides are synthetic auxins or other growth regulators, the results of these experiments suggest that the addition of the solutions of the present invention may detoxify the possible effects of residual herbicides in soil.

It is apparent that there has been provided in accordance with this invention a fertilizer and/or soil amendment which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A solution suitable for use as a fertilizer to promote the growth of grass and plants and as a soil amendment, said solution consisting essentially of from about 0.05% to about 15% L ascorbic acid, from about 10% to about 50% marine algae and the balance humic acid in a water solution.

2. A solution according to claim 1 wherein said humic acid is present in an amount greater than about 50%.

3. A solution according to claim 2 wherein said humic acid comprises an acid radical of Leonardite.

4. A solution according to claim 2 wherein said humic acid comprises an acid radical of Lignite.

5. A solution according to claim 1 wherein said water is present in an amount up to about 50%.

6. A solution according to claim 1 wherein said humic acid is present in an amount from about 30% to about 80% and said water is present in an amount from about 10% to about 50%.

7. A solution according to claim 1 wherein said solution consists essentially of from about 1% to about 5% L ascorbic acid, from about 20% to about 35% marine algae, from about 55% to about 65% humic acid and the balance essentially water.

8. A solution for promoting root growth of grass and plants consisting essentially of from about 0.5% to about 2% L ascorbic acid, from abut 10% to about 50% marine algae, from about 30% to about 80% humic acid and the balance essentially water.

9. A solution for promoting overall plant growth consisting essentially of from about 4% to about 6% L ascorbic acid, from about 10% to about 50% marine algae, from about 30% to about 80% humic acid and the balance essentially water.

10. A composition suitable for use as a fertilizer for promoting grass and plant growth and as a soil amendment, said composition including a salt of humic acid, marine algae, and L ascorbic acid with the weight ratio of the humic acid salt to the L ascorbic acid being from about 2:1 to about 5:1 and the weight ratio of the marine algae to the L ascorbic acid being from about 1:1 to about 2:1.

11. A method for preparing a solution suitable for use as a fertilizer for promoting grass and plant growth and as a soil amendment, said method comprising:
 mixing from about 10 to about 25 parts of L ascorbic acid with from about 50 parts to about 500 parts water;
 adding from about 100 parts to about 300 parts marine algae to the solution; and
 adding from about 300 parts to about 600 parts humic acid to the solution.

12. A method according to claim 11 which further comprises adding from about 5 parts to about 10 parts of a neutralizing agent prior to said marine algae adding step so as to form a solution having a pH in the range of from about 5.5 to about 7.0.

13. A method according to claim 12 wherein said neutralizing agent adding step forms a solution having a pH in the range of from about 6.0 to about 6.5.

14. A method according to claim 12 wherein said neutralizing agent adding step comprises adding from about 5 parts to about 10 parts of at least one of potassium hydroxide and sodium hydroxide.

* * * * *